US012770658B2

(12) United States Patent
Kumar

(10) Patent No.: US 12,770,658 B2
(45) Date of Patent: Oct. 20, 2026

(54) MANAGING VIDEO STREAMS FOR A TIMELINE BASED ON IDENTIFIED OBJECTS OF INTEREST

(71) Applicant: DRAGONFRUIT AI, INC., Menlo Park, CA (US)

(72) Inventor: Amit Kumar, Menlo Park, CA (US)

(73) Assignee: DRAGONFRUIT AI, INC., Menlo Park, CA (US)

(*) Notice: Subject to any disclaimer, the term of this patent is extended or adjusted under 35 U.S.C. 154(b) by 0 days.

(21) Appl. No.: 17/831,532

(22) Filed: Jun. 3, 2022

(65) Prior Publication Data

US 2023/0395096 A1 Dec. 7, 2023

(51) Int. Cl.

| | |
|---|---|
| ***G11B 27/34*** | (2006.01) |
| ***G06V 20/40*** | (2022.01) |
| ***G06V 20/52*** | (2022.01) |
| ***G11B 27/031*** | (2006.01) |

(52) U.S. Cl.

CPC .............. *G11B 27/34* (2013.01); *G06V 20/40* (2022.01); *G06V 20/52* (2022.01)

(58) Field of Classification Search

USPC .................................................. 386/223–230

See application file for complete search history.

(56) References Cited

U.S. PATENT DOCUMENTS 9,082,018 B1 * 7/2015 Laska .............. G08B 13/19606
2012/0216121 A1 * 8/2012 Lin ................ H04N 21/234327 709/219
2013/0091432 A1 * 4/2013 Shet ...................... G06F 16/532 715/719
2014/0026053 A1 * 1/2014 Huang ................... G11B 27/28 715/723
2015/0015680 A1 * 1/2015 Wang ..................... G11B 27/19 348/51
2017/0208348 A1 * 7/2017 Cheng .................... H04N 21/84
2018/0060647 A1 * 3/2018 Tsuboshita ........... G06V 40/168
2018/0113577 A1 * 4/2018 Burns ................ H04N 21/4334
2019/0130202 A1 * 5/2019 Doumbouya ......... G06F 18/256
2021/0065746 A1 * 3/2021 Sugano ................ G11B 27/031

* cited by examiner

*Primary Examiner* — Hung Q Dang

(57) ABSTRACT

Systems, methods, and software to manage video streams for a timeline based on objects of interest identified in the video streams. In one example, a video processing system obtains video streams from video sources for a physical area and identifies one or more objects of interest in the physical area. The video processing system further identifies, for each of the video streams, one or more portions of the video stream that include at least one object of interest of the one or more objects of interest and generates a timeline to provide a visual display of the identified portions.

19 Claims, 6 Drawing Sheets

MANAGING VIDEO STREAMS FOR A TIMELINE BASED ON IDENTIFIED OBJECTS OF INTEREST

BACKGROUND

Security or surveillance cameras are effective tools for monitoring a physical area, such as a public space, a store, or some other physical areas. The cameras are often connected via wires or wirelessly to a computing device that can display the video streams from the cameras and/or store the video streams for future use. The viewing and storage of the video streams can be local, such as on the same local network, or can be remote, such a remote client system.

However, while the security and surveillance cameras can capture the video streams associated with the physical area of interest, difficulties arise in identifying data of interest from the streams. Often, users may be required to monitor each of the streams individually and identify events of interest from the monitored video. This monitoring of the video streams is inefficient, requiring individuals to monitor the video streams associated with multiple different cameras. Additionally, relying on human monitoring can cause users to miss or otherwise mislabel events that occur within the video streams, or fail to identify relevant camera angles when the same event is captured using multiple cameras.

Overview

Provided herein are systems, methods, and software to manage video streams for a timeline based on objects of interest in the video streams. In one implementation, a video processing system obtains video streams from video sources for a physical area and identifies one or more objects of interest in the physical area. The video processing system further, for each of the video streams identifies one or more portions of the video stream that include at least one object of interest of the one or more objects of interest. Once the portions are identified, the video processing system generates a timeline, wherein the timeline indicates when each of the portions occur relative to the other portions.

In one implementation, the video processing system identifies a request to playback the portions of the video streams associated with the timeline. In response to the request, the video processing system generates a display that displays the portions of the video streams as a function of time in accordance with the timeline.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
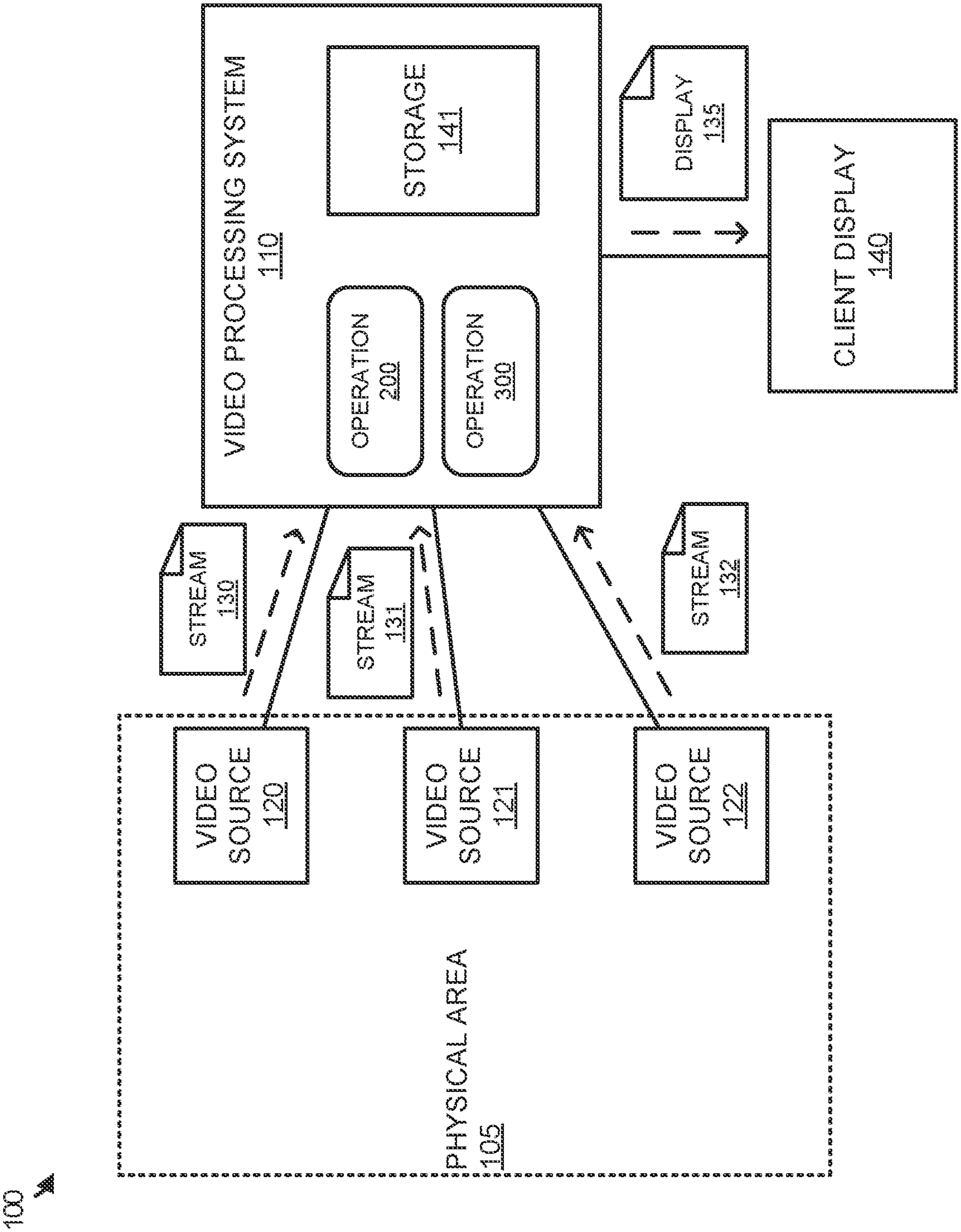
FIG. 1 illustrates a computing environment that manages video streams in association with an event timeline according to an implementation.

FIG. 1 illustrates a computing environment 100 that manages video streams in association with an event timeline according to an implementation. Computing environment 100 includes physical area 105, video processing system 110, and client display 140. Physical area 105 may comprise a business, a public place, or some other physical area capable of being monitored by video sources 120-122. Video processing system 110 includes storage 141 for storing the video streams from video sources 120-122 and provides operation 200 further described below with respect to FIG. 2 and operation 300 further described below with respect to FIG. 3. Video sources 120-122 provide streams 130-132 to video processing system 110. Video processing system 110 may store at least a portion of the received video streams in storage 141 and provide display 135 to client display 140. Video processing system 110 may comprise one or more computers, including desktop computers, server computers, laptops, tablets, or some other computer. Video processing system 110 may comprise one or more processors and memory to store program instructions to provide the operations described herein. Client display may comprise a client device, such as a desktop computer, tablet, and the like, or may comprise a monitor directly coupled to video processing system 110. Although demonstrated with three video sources in the example of FIG. 1, any number of video sources can be coupled to video processing system 110.

In computing environment 100, video sources 120-122 comprise surveillance or security cameras that are used to monitor physical area 105 and generate video streams 130-132 that are communicated to video processing system 110. Video sources 120-122 may provide different angles in association with physical area 105, may provide different video qualities (e.g., frame rate, resolution, and the like), or may provide some other aspect in association with physical area 105. Video processing system 110 may process the streams 130-132 and generate display 135, wherein display 135 may provide a timeline for an event in streams 130-132. The event may correspond to an activity by one or more objects within physical area 105, such as a robbery in a store, may correspond to the movement of a particular object or objects within physical area 105, or may correspond to some other event.

In some implementations, a user of video processing system 110 provides definitions or attributes associated with one or more objects of interest. The objects of interest may comprise people, vehicles, animals, products, or some other object of interest. For example, a user of video processing system 110 may indicate that an object of interest is a person, and the person is wearing a certain color. The user may further provide a period for which to search video streams 130-132 for the object of interest. Thus, while the video streams can be communicated to video processing system 110 continuously, the period may be used to process only video data associated with the defined period. After the attributes are provided, video processing system 110 can perform object recognition using the attributes to identify when the one or more objects defined by the user are present in the video streams and tag the relevant portions for the timeline.

Returning to the example of the store robbery, a user may identify one or more persons of interest in a video stream from video streams 130-132. The user may select the one or more persons of interest by defining attributes of the persons of interest (e.g., shirt color, skin color, hair color, and the like), by clicking or selecting a person of interest in at least one frame from video streams 130-132, or by some other mechanism. The user may also define a relevant period to search for the corresponding persons of interest. In response to the selection, video processing system 110 may process video streams 130-132 to identify portions with the one or more persons of interest. In some implementations, video processing system 110 identifies portions of the video streams that include all the persons of interest. In other implementations, video processing system 110 identifies portions of the video streams with at least one person of the one or more persons of interest.

After the portions of interest are identified in association with each of the video streams, video processing system 110 may generate a display to playback the identified portions as a function of time. As an example, video processing system 110 may for a first period in a timeline display streams 130-131 as the streams include at least one object of interest. However, during a second period, video processing system 110 may display streams 131-132 as the streams include at least one object of interest. In some implementations, during the playback, only video streams identified with the one or more objects of interest are displayed. In other implementations, during the playback, video streams identified with the one or more objects of interest are promoted in the display over video streams without an object of interest. For example, video stream 130 may include an object of interest, when video streams 131-132 do not include an object of interest. As a result, video stream 130 may be promoted over the other video streams in providing the playback to a user of video processing system 110. The promotion may include preventing the display of the other video sources during the period, displaying video stream 130 at a bigger size and/or resolution than the other video streams, highlighting the video streams.

In some implementations, the user of video processing system 110 interacts with a timeline to display periods of interest in the timeline. For example, the user may scrub on a visual representation of the timeline to move the video streams to a period of interest. The user may also select playback rate, quality, or some other preference in association with the playback of the video.

Figure 2:
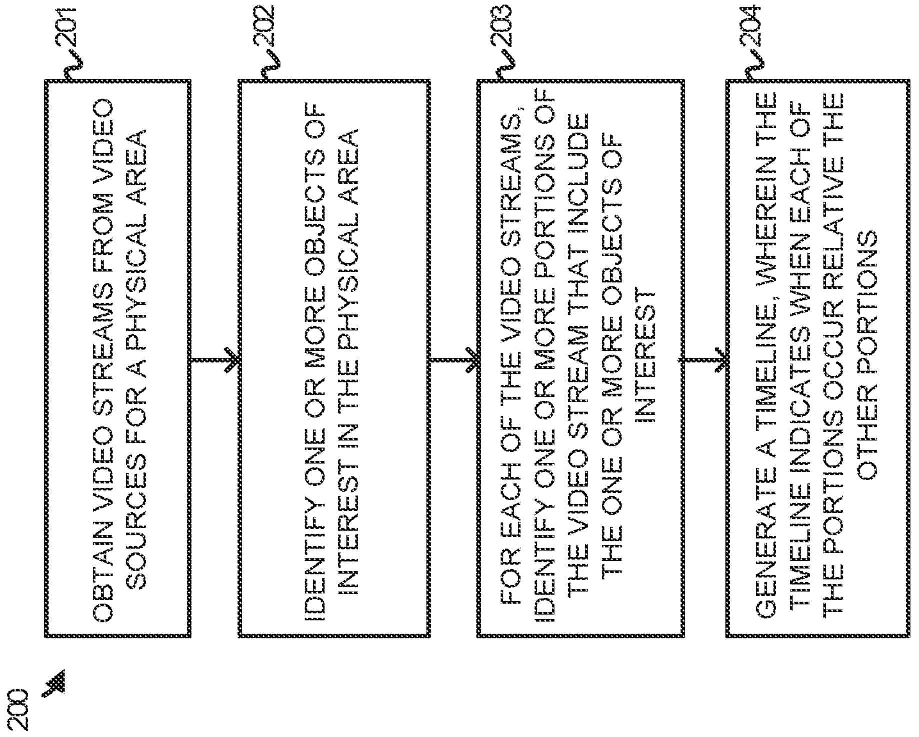
FIG. 2 illustrates an operation of a video processing system to manage video streams in association with an event timeline according to an implementation.

FIG. 2 illustrates an operation 200 of a video processing system to manage video streams in association with an event timeline according to an implementation. The steps of operation 200 are referenced parenthetically in the paragraphs that follow with reference to systems and elements of computing environment 100 of FIG. 1.

For operation 200, video processing system 110 obtains (201) video streams from video sources of a physical area. The physical area may comprise an indoor or outdoor private or public space, such as a park, office, retail store, or some other physical area. The video sources may comprise security or surveillance cameras that monitor the physical area from different perspectives and orientations. After the video streams are obtained, operation 200 further identifies (202) one or more objects of interest in the physical area. In some implementations, a user of video processing system 110 identifies attributes of interest associated with the one or more objects. The attributes may comprise colors, shapes, object types, and the like. For example, the attributes associated with a traffic surveillance may include a vehicle type, a vehicle color, or some other information associated with one or more vehicles in the physical area. In other implementations, the user may select one or more objects in at least one frame and video processing system 110 extracts the attributes of the selected object to monitor the object across the video streams. For example, the user may select a vehicle in a traffic surveillance system and video processing system 110 may identify vehicle type, color, or other attributes from image recognition.

After the one or more objects are identified, operation 200 further identifies (203), for each of the video streams one or more portions of the video stream that include at least one object of interest of the one or more objects of interest. In identifying the portions, video processing system 110 may perform image recognition to identify the objects of interest with attributes that match the desired objects defined at step 202. In some implementations, video processing system 110 will only identify portions where all objects of interest are located within the frame. In other implementations, video processing system 110 will identify portions with any number of the objects. In some examples, video processing system 110 will identify timestamps indicating when at least one object of interest is in the frame. The timestamps can be used to synchronize the video streams relative to one another, wherein the timestamps can be provided by the video source itself, or assigned to the video streams In at least one implementation, video processing system 110 identifies a period of interest for the video streams, wherein video processing system 110 can will only identify the objects of interest within that period. For example, a user may indicate a ten-minute period relevant to an event within a department store. The selection can be made via a slider, dropdown menu, manual entry, or some other mechanism. In response to the selection and the identification of the traits for the one or more objects of interest, video processing system 110 may process the video streams during the period to determine portions in the video streams that at least one of the objects is present in the video data.

After the portions are identified, operation 200 further generates (204) a timeline, wherein the timeline indicates when each of the portions occur relative to the other portions. For example, the timeline may include separate lines each corresponding to a different video stream, wherein the different lines indicate portions that include at least one object of interest relative to time and the other streams. For example, a during a first period, the timeline may indicate that video streams 130-131 each include at least one object of interest, while during a second period, the timeline may indicate that video streams 131-132 each include at least one object of interest. Advantageously, at any instance during the period for the objects of interest, a user of video processing system 110 may identify the one or more video sources that capture the objects of interest and may monitor the movement of the objects within physical area 105.

Figure 3:
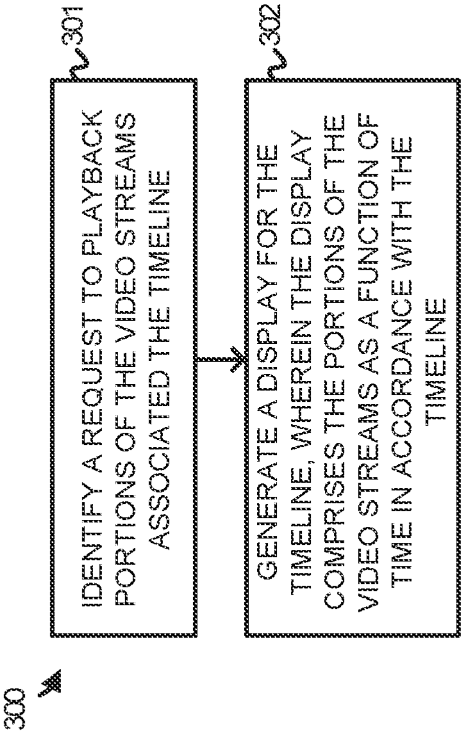
FIG. 3 illustrates an operation of a video processing system to provide a display of video streams in association with an event timeline according to an implementation.

FIG. 3 illustrates an operation 300 of a video processing system to provide a display of video streams in association with an event timeline according to an implementation. The steps of operation 300 are referenced parenthetically in the paragraphs that follow with reference to systems and elements of computing environment 100 of FIG. 1.

Operation 300 includes identifying (301) a request to playback the video streams associated with the timeline and, in response to the request, generating (302) a display, wherein the display shows the portions of the video streams as a function of time in accordance with the timeline. As an example, physical area 105 may represent a department store, and video processing system 110 can be configured to monitor a particular person within the department store. The person can be individually selected or can be identified via traits associated with the person. For example, a user of video processing system 110 may identify clothing colors, hair color, or other attributes associated with a person of interest. Video processing system 110 can then use the attributes and image recognition to identify and monitor the person in video streams 130-132.

After portions of the video streams are identified with the object or objects of interest, video processing system 110 can use the timeline that indicates when each of the portions occur relative to one another to generate a display for the timeline. In some implementations, the timing information may be provided as part of the video stream from the video source, wherein the video source may apply a timestamp to the video stream. In other implementations, video processing system 110 applies the timestamps based on a synchronization of the cameras, wherein timestamps can be applied as the video data is obtained at video processing system 110. For example, as video data is obtained from each of video sources 120-122, video processing system 110 may add metadata indicating timestamps associated with the video data.

In some implementations, in generating the display, the playback of the video streams may only include video streams with an object of interest while not displaying video streams without the object of interest. For example, if at a first instance, an object of interest was identified in stream 130 and not in video streams 131-132, then the display would provide the feedback corresponding to the portion of video stream 130. At a second instance, the object of interest is identified in both video streams 130-131 and not video stream 132, then the playback will be provided for only video streams 130-131. Advantageously, during a playback period, only video streams with desired objects of interest will be displayed for the user, permitting a user to quickly identify relevant information.

In some implementations, the display generated by operation 300 may display all the available video streams and will promote the video streams that contain the objects of interest during the playback of the video streams. The promotion may include highlighting the video streams with the objects of interest, increasing the size associated with the video streams with the objects of interest, or providing some other promotion in association with the video streams that include the objects of interest. During the playback, changes in the video streams that contain the objects of interest will be reflected in the display. Thus, while a first set of one or more video streams will be promoted during a first period of the playback, a second set of one or more video streams will be promoted during a second period of the playback.

In some examples, when multiple portions are identified during a period, video processing system 110 may identify a video stream of interest from the available portions. For example, video streams 130-131 may each include one or more objects of interest. When generating the display, video processing system 110 may identify a most relevant stream or stream of interest from the video streams based on a variety of factors. The variety of factors may include the size of the objects of interest identified in the video streams, the number of objects of interest identified in the video streams, the movement of the objects of interest in each of the video streams or some other factor. Once prioritized, the most prioritized stream can be promoted in the display for the end user, wherein the promotion can include providing the prioritized stream at a higher quality or resolution, a larger size, highlighted over the other streams, or some other promotion.

Figure 4:
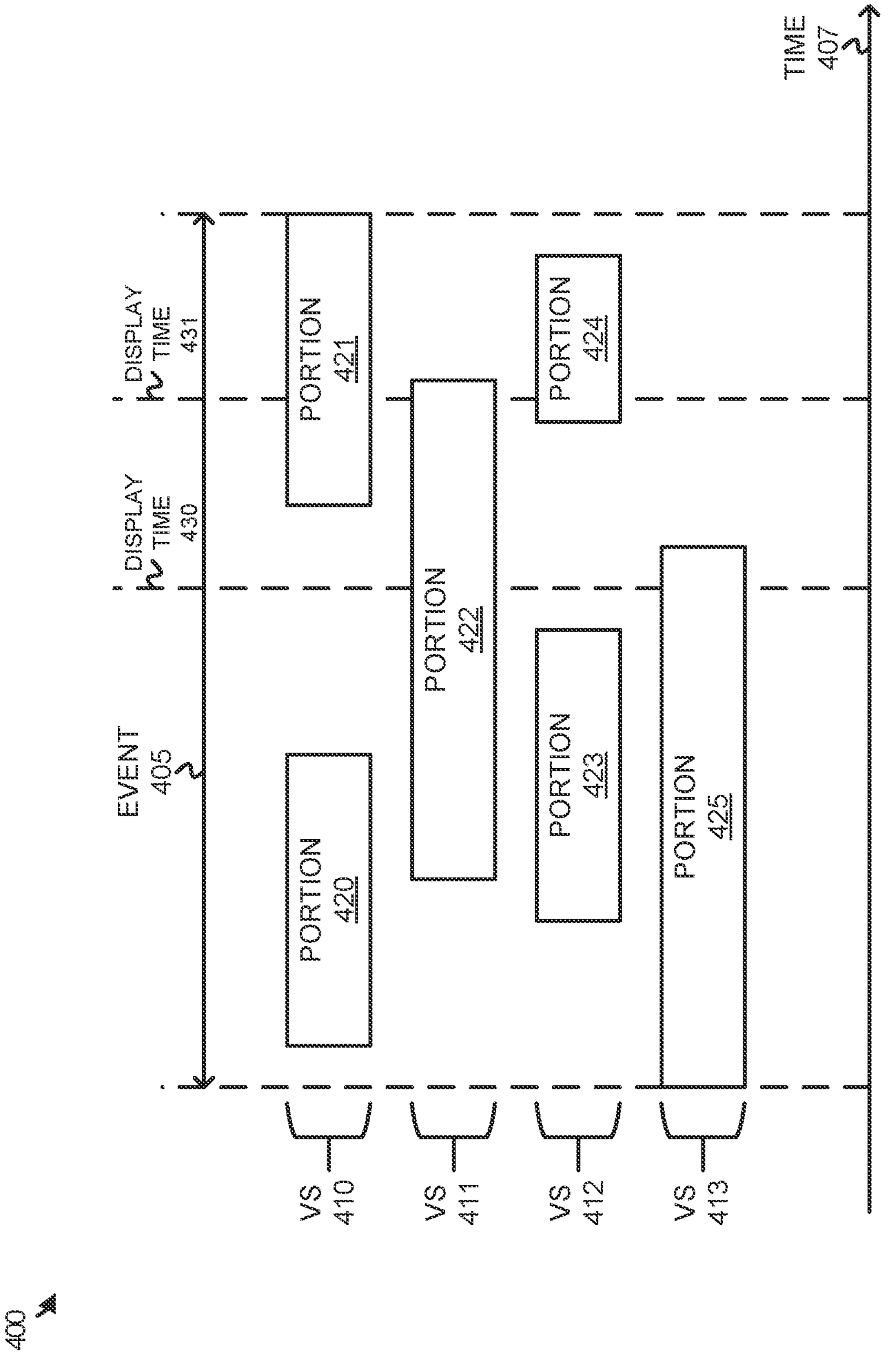
FIG. 4 illustrates a timeline for video streams in association with an event according to an implementation.

FIG. 4 illustrates a timeline 400 for video streams in association with an event according to an implementation. Timeline 400 includes event 405, time axis 407, video streams 410-413, portions 420-425, and display times 430-431. Timeline 400 is representative of a timeline that is generated by video processing system 110, although other examples may exist. Although demonstrated with four different video streams, similar operations may be performed on any number of video streams.

As described herein, a video processing system may receive video streams associated with multiple video sources and may identify objects of interest within the video streams. The objects of interest may comprise people, vehicles, or some other object of interest that moves through the physical area supported by the video sources. The objects of interest may be identified using attributes associated with each of the objects of interest, wherein the attributes may be defined by a user or may be abstracted from an object of interest selected from a frame of the video streams.

Here, an event 405 is identified corresponding to one or more objects of interest being in the physical area of interest. Event 405 may comprise a robbery, a car accident, or some other event of interest. Event 405 can be defined by a user, wherein a user can define the period for the event or can be defined based on the length of time that objects of interest are present in the physical area monitored by the video sources. During event 405, each vides stream 410-413 is processed to identify portions 420-425 that include at least one object of interest. In some examples, a portion can be identified when any number of objects are in the frame of the video stream. In other examples, a portion is only identified when all objects of interest are located within the frame of the video stream.

Once the portions are identified, timeline 400 can be created, which indicates the identified portions as a function of time in relation to the other portions. In some implementations, each of the video streams may be assigned timestamps to provide synchronization between the video streams. The timestamps can be included by the video sources or can be added by the video processing system to synchronize different video streams 410-413.

In timeline 400, various portions overlap, indicating that multiple video streams include at least one object of interest. For example, during display time 430 video streams 411 and 413 include at least one object of interest corresponding to portions 422 and 425. However, at a later display time 431, video streams 410-412 include at least one object of interest corresponding to portions 421, 422, and 424. When a playback is requested corresponding to timeline 400, portions 420-425 are displayed as a function of time 407. In some implementations, only portions 420-425 are displayed, such that when an object of interest is not identified in a video stream, the video stream will not be displayed. For example, at display time 430, only portions 422 and 425 will be displayed. In another implementation, portions 420-425 will be displayed differently or promoted over video streams that do not include at least one object of interest. The promotion may include increasing the size of the video streams with the portions over other video streams without at least one object of interest, highlighting video streams with the portions over other video streams without at least one object of interest, or some other promotional display mechanism. Returning to the example of display time 430, video streams 411 and 413 may be provided as a larger window and/or higher resolution than video streams 410 and 412. In contrast, at display time 431, video streams 410-412 can be provided as a larger window and/or higher resolution than video stream 413.

In some implementations, when multiple portions are identified at a single instance, the portions can be prioritized based on a variety of factors. The prioritization may include the number of objects of interest in each of the portions, the size of the objects in the portions, the orientation of the objects relative to the video source, or some other factor. As an example, during display time 431, one or more of the aforementioned factors can be used to prioritize portions 421, 422, and 424. Once prioritized, the higher priority stream or streams can be promoted in the display provided to the end user of the video processing system. Thus, if portion 424 included more objects of interest than portions 421-422, the video processing system may determine that portion 424 should be promoted in the display of the video streams.

In some examples, no video streams may include an object of interest. During these periods, the video processing system may skip or move the playback forward to the next period that includes a relevant portion. The skipping may include increasing that playback rate in some examples.

Figure 5A:
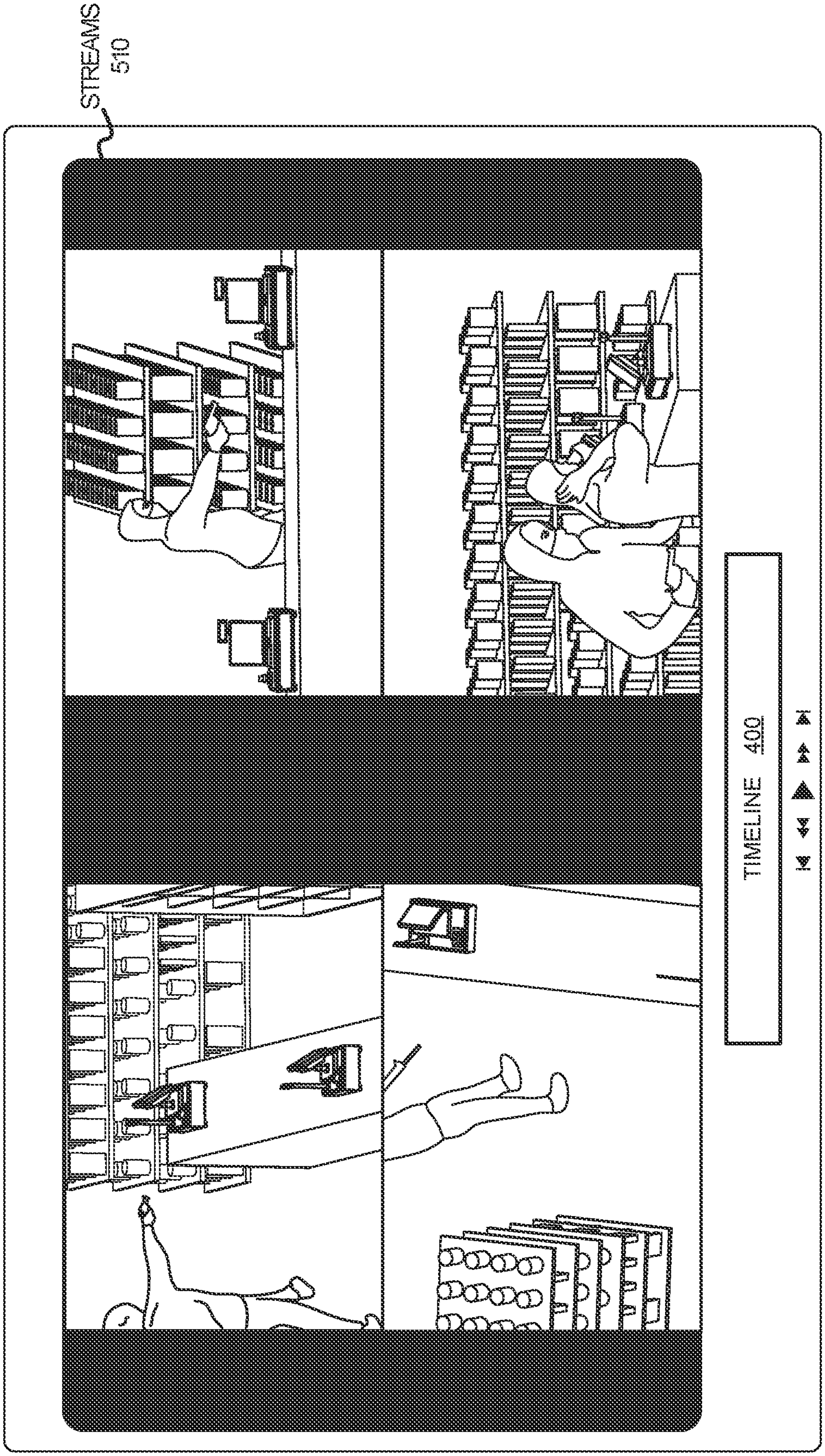
FIG. 5A-5B illustrate example user interfaces to display playback of video streams associated with a timeline according to an implementation.
Figure 5B:
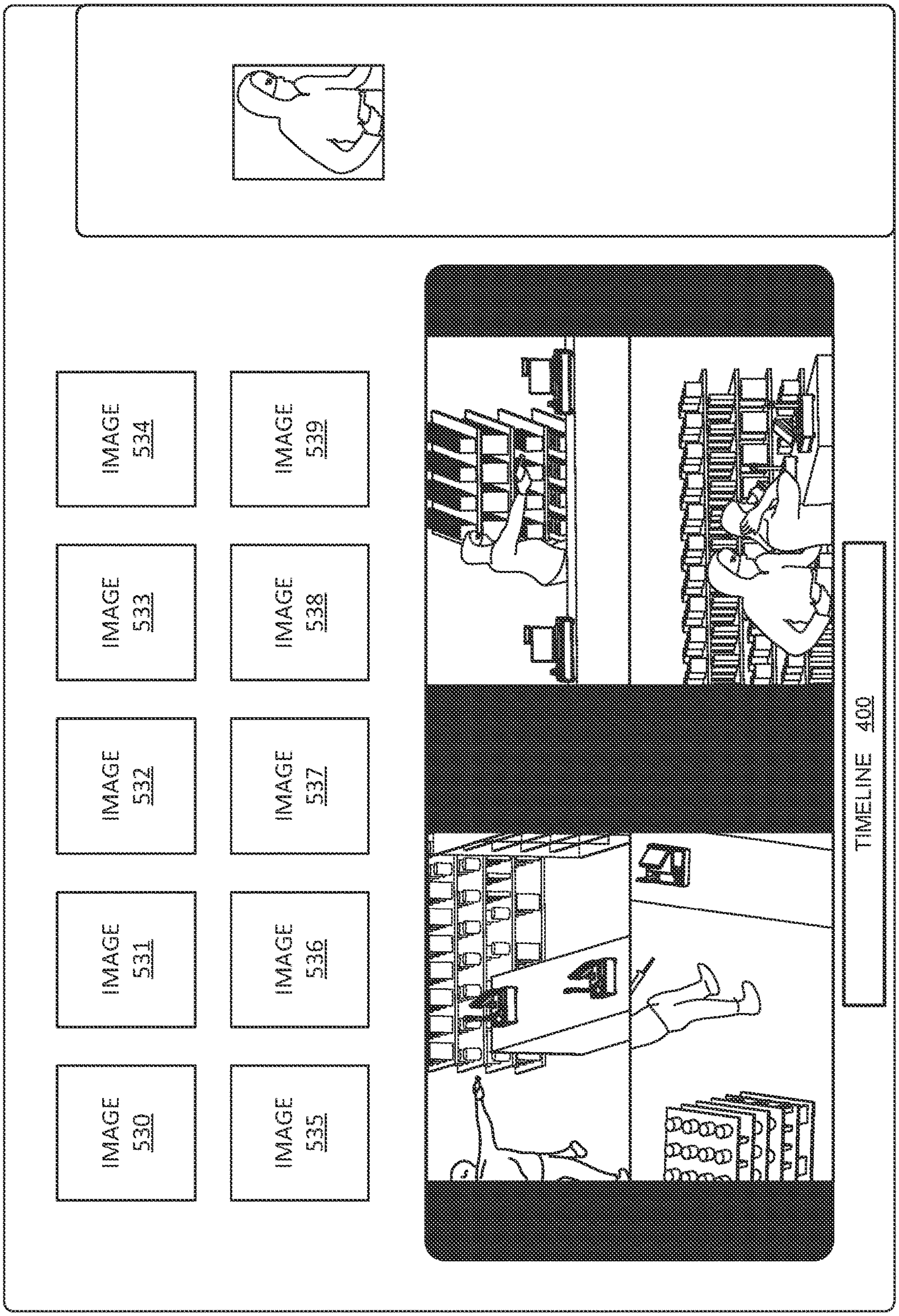

FIG. 5A-5B illustrate example user interfaces to display playback of video streams associated with a timeline according to an implementation. FIG. 5A includes streams 510. FIG. 5B includes streams 520 and images 530-539. FIGS. 5A and 5B further include timeline 400, although other example timelines are possible. Timeline 400 can be used to indicate the portions with items of interest, can permit the user to scroll or scrub to desired times, can permit the user to change the playback rate, or can be used to provide some other feedback on the video streams. The user can also select options on whether to display only the relevant streams, promote a most relevant stream, or select some other option. Further, the user interface can permit a user to select attributes associated with desired objects of interest, a period for identifying the objects of interest, or some other option associated with generating the timeline or playback associated with the timeline.

Referring first to FIG. 5A, after a timeline is generated that indicates portions with at least one object of interest, a user of a video processing system may request to playback the portions, wherein the portions are played back in accordance with the timeline. In some implementations, only the portions with at least one object of interest are displayed as part of the playback. In this embodiment, as the timeline plays, different streams can be displayed that include the relevant portions. Thus, during a first period, first streams will be displayed, while during a second period, second streams will be displayed. The first and second streams may share at least one of the streams in some examples.

Although demonstrated as the same size in the example of FIG. 5A, one or more of the video streams can be promoted in some examples. The promotion may include increasing the size of the one or more video streams, highlighting the one or more of the video streams, or some other mechanism of promotion. The promotion can be based on a variety of factors, including the number of objects of interest identified in the frame of the video streams, the size of the objects of interest, the orientation of the objects of interest, or some other factor.

In some implementations, rather than only displaying the video streams with objects of interest, the display may include all streams and may promote the streams that include at least one object of interest. The promotion may increase the size, resolution, highlight, or otherwise promote the streams with objects of interest over the streams without objects of interest. This promotion may change as a function of time as different video streams are identified with at least one of the objects of interest.

Turning to FIG. 5B, FIG. 5B demonstrates an alternative user interface that includes images 530-539 representative of screenshots from the video streams. The images may correspond to frames of the video streams that captured objects of interest in a particular orientation, objects of interest at a certain size, frames or portions of frames selected by a user, or some other image related to the objects of interest. The user can further select one of the images that can be expanded in a separate window.

Timeline 400 is included to indicate relevant portions that are identified for each of the video streams. In some examples, the user can select a desired time on the timeline and playback the one or more streams at the selected time. The user can also select specific portions for an expanded view, a playback speed, or provide some other feedback in association with the video streams.

In some implementations, although not demonstrated in FIGS. 5A-5B, the user interface may provide or select attributes associated with the objects of interest. These attributes can be used in identifying the relevant portions from the video streams. In other implementations, the user interface may permit a user to manually select an object of interest from a frame of video using a cursor, touch, or some other interface mechanism. In response to the selection, the video processing system may identify the attributes associated with the selected object of interest and use the attributes to identify the object in the various video streams. For example, a user may identify a person of interest in a robbery from a frame of a video stream. Once the person is identified, the video processing system may extract the attributes associated with the person and use the attributes to identify and monitor the person in the area of interest.

Figure 6:
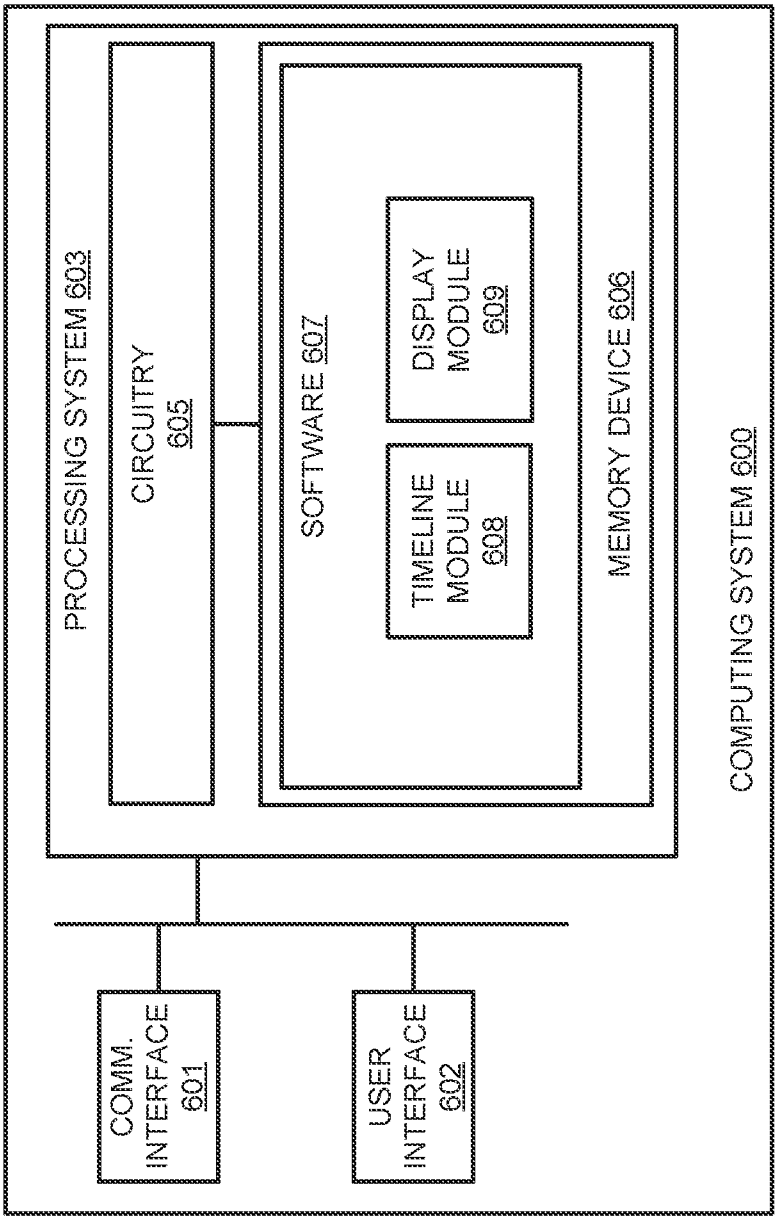
FIG. 6 illustrates a computing system to manage video streams in association with an event timeline according to an implementation.

FIG. 6 illustrates a computing system 600 to manage video streams in association with an event timeline according to an implementation. Computing system 600 is representative of any computing system or systems with which the various operational architectures, processes, scenarios, and sequences disclosed herein for a video processing system, such as video processing system 110 of FIG. 1. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 may be configured to communicate with one or more video sources including security or surveillance cameras. Communication interface 601 can further be configured to communicate with computing devices that provide storage for the video data associated with the video sources. The computing devices may comprise server computers, desktop computers, or other computing systems available via a local network connection or the internet. Communication interface 601 may also communicate with client computing devices, such as laptop computers or smartphones, permitting a user associated with computing system 600 to provide preferences and selections associated with streams, the overhead map, and the trends of interest.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. In some implementations, user interface 602 may permit a user to request and process various video data stored in multiple storage locations. User interface 602 may be omitted in some examples. In at least one implementation, user interface Processing circuitry 605 comprises microprocessor and other circuitry that retrieves and executes operating software 607 from memory device 606. Memory device 606 may include volatile and nonvolatile, removable, and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes timeline module 608 and display module 609, although any number of software modules may provide the same operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, timeline module 608 directs processing system 603 to obtain video streams from video sources for a physical area. The video streams may be streamed directly from the video sources or can be streamed from a storage system associated with the video sources, including local storage at computing system 600. Timeline module 608 further directs processing system 603 to identify one or more objects of interest in the physical area, wherein the objects can be identified via attributes associated with the objects, or user selection of the desired object. In at least one example, a display can provide a frame from one of the video streams and the user can select the object within the frame using touch, a pointer, or some other interface mechanism. Once selected, attributes about the selected object can be identified and used in monitoring the object. In another example, a user may use one or more menus to select attributes associated with an object of interest, such as the color of the object, object type, or some other attribute information.

After identifying the one or more objects of interest, timeline module 608 directs processing system 603 to identify, for each of the video streams, one or more portions of the video stream that include at least one object of interest of the one or more objects of interest. In some examples, the user may provide a timeframe or period of interest associated with the one or more objects of interest. During the period, computing system 600 may search the period in each of the streams to identify the one or more objects of interest. The search may include image recognition capable of identifying the one or more objects of interest using the attributes associated with the one or more objects of interest.

Once the portions of the video streams are identified, timeline module 608 further generates a timeline, wherein the timeline indicates when each of the portions occur relative to the other portions. The timeline may indicate when each of the video streams captured at least one of the objects of interest.

After generating the timeline, display module 609 directs processing system 603 to identify a request to playback the portions of the video streams associated with the timeline. In response to the request, display module 609 directs processing system 603 to generate a display, wherein the display a playback of the portions of the video streams as a function of time in accordance with the timeline. The display may further include the timeline itself in some examples, wherein the display of the timeline may indicate each of the video streams and the portions of the video streams with at least one of the objects of interest. For example, the timeline may indicate that a first video stream contains an object of interest during a first period and may indicate that a second and third video stream contain the object of interest during the second period. The user of computing system 600 may scrub or switch to a relevant portion of the timeline to view the portions corresponding to the timeline. In some examples, all objects of interest must be identified in a video stream for the portion to be identified for the timeline. In other examples, any subset of the objects of interest can be identified in a video stream for the portion to be identified for the timeline.

In some implementations, only the video streams from the identified portions are displayed for the playback. Thus, during a first period, a first set of one or more streams can be displayed, wherein at least one object of interest is included in the first set. However, during a second period, a second set of one or more streams can be displayed that include at least one object of interest. In some implementations, all video streams are displayed, but the video streams with at least one object of interest are promoted during the playback. The promotion may include increasing the size of the streams with the objects of interest relative to the streams without the objects of interest, highlighting the streams with the objects of interest relative to the streams without the objects of interest, or some other promotional technique. Accordingly, during a first period one or more first streams can be promoted over the other remaining streams, while during a second period one or more second streams can be promoted over the remaining streams.

In some examples, when multiple streams include at least one object of interest at a single instance, the streams can be prioritized to provide the most information to the end user of computing system 600. The streams may be prioritized based on the number of objects of interest within the frame (e.g., more over less), the size of the objects of interest within the frame (e.g., larger over smaller), the orientation of the objects of interest within the frame (e.g., video source facing favored over other orientations), or based on some other factor. For example, during a timeline, two streams may include at least one object of interest. Display module 609 can direct processing system 603 to prioritize one of the streams over the other based on the aforementioned factors. Once prioritized, the higher priority stream can be promoted within the display over the other stream. The promotion may include increasing the size of the stream, highlighting the stream, or some other mechanism of promotion.

The included descriptions and figures depict specific implementations to teach those skilled in the art how to make and use the best option. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
- obtaining video streams from video sources for a physical area;
- identifying one or more objects of interest in the physical area;
- in response to determining that portions from at least two of the video streams capture an object of interest of the one or more objects of interest, generating a timeline indicating when each of the portions occur relative to one another;
- in response to determining a subset of the portions overlap during a period in the timeline, determining that the subset of the portions capture the object of interest contemporaneously during the period;
- identifying a portion of interest from the subset of the portions based on attributes identified in association with the one or more objects of interest captured in the subset of the portions, wherein the attributes comprise sizes of the one or more objects of interest captured in each portion of the subset of the portions, a complete view of the one or more objects of interest in each portion of the subset of the portions, or an orientation associated with the one or more objects of interest in each portion of the subset of the portions;
- identifying a request to playback the portions of the video streams associated with the timeline; and
- in response to the request, generating a display, wherein the display comprises a playback of the portions of the video streams as a function of time in accordance with the timeline, and wherein the display visually promotes the portion of interest over one or more remaining portions in the subset of the portions during the period.

2. The method of claim 1, wherein the display further includes a visual representation of the timeline.

3. The method of claim 1, wherein the display visually promotes the portion of interest over the one or more remaining portions by increasing a display window size of the portion of interest relative to the one or more remaining portions.

4. The method of claim 1, wherein the display visually promotes the portion of interest over the one or more remaining portions by highlighting the portion of interest relative to the one or more remaining portions.

5. The method of claim 1, wherein the video sources comprise cameras.

6. The method of claim 1 further comprising:
- identifying a period of interest; and
- wherein identifying the one or more objects of interest in the physical area comprises identifying the one or more objects of interest in the physical area during the period of interest.

7. The method of claim 1, wherein each of the video streams captures the physical area from different angles.

8. A computing apparatus comprising:
- one or more computer readable storage media;
- a processing system operatively coupled to the one or more computer readable storage media; and
- program instructions stored on the one or more computer readable storage media that, when executed by the processing system, direct the computing apparatus to:
  - obtain video streams from one or more video sources for a physical area;
  - identify one or more objects of interest in the physical area;
  - in response to determining that portions from at least two of the video streams capture an object of interest of the one or more objects of interest, generate a timeline indicating, when each of the portions occur relative to one another;
  - identify a subset of the portions that overlap during a period in the timeline, wherein the portions overlap when two or more of the portions capture the object of interest contemporaneously;
  - identify a portion of interest from the subset of the portions based on attributes identified in association with the one or more objects of interest captured in the subset of the portions, wherein the attributes comprise sizes of the one or more objects of interest captured in each portion of the subset of the portions, a complete view of the one or more objects of interest in each portion of the subset of the portions, or an orientation associated with the one or more objects of interest in each portion of the subset of the portions;
  - identify a request to playback the portions of the video streams associated with the timeline; and
  - in response to the request, generate a display, wherein the display comprises a playback of the portions of the video streams as a function of time in accordance with the timeline, and wherein the display visually promotes the portion of interest over one or more remaining portions in the subset of the portions during the period.

9. The computing apparatus of claim 8, wherein the display further includes a visual representation of the timeline.

10. The computing apparatus of claim 8, wherein the display visually promotes the portion of interest over the one or more remaining portions by increasing a display window size of the portion of interest relative to the one or more remaining portions.

11. The computing apparatus of claim 8, wherein the display visually promotes the portion of interest over the one or more remaining portions by highlighting the portion of interest relative to the one or more remaining portions.

12. The computing apparatus of claim 8, wherein the one or more video sources comprise cameras.

13. The computing apparatus of claim 8, wherein the program instructions further direct the computing apparatus to:

identify a period of interest; and wherein identifying the one or more objects of interest in the physical area comprises identifying the one or more objects of interest in the physical area during the period of interest.

14. The computing apparatus of claim 8, wherein each of the video streams captures the physical area portions from different angles.

15. A system comprising:

a plurality of cameras; and a video processing system with memory and at least one processor configured to:

obtain video streams from one or more video sources for a physical area;

identify one or more objects of interest in the physical area;

in response to determining that portions from at least two of the video streams capture an object of interest of the one or more objects of interest, generate a timeline indicating, indicates when each of the portions occur relative to one another;

identify a subset of the portions that overlap during a period in the timeline, wherein the portions overlap when two or more of the portions capture the object of interest contemporaneously;

identify a portion of interest from the subset of the portions based on attributes identified in association with the one or more objects of interest captured in the subset of the portions, wherein the attributes comprise a size of the one or more objects of interest, a complete view of the one or more objects of interest, or an orientation associated with the one or more objects of interest;

identify a request to playback the portions of the video streams associated with the timeline; and in response to the request, generate a display, wherein the display shows the portions of the video streams as a function of time in accordance with the timeline, and wherein the display visually promotes the portion of interest over one or more remaining portions in the subset of the portions during the period.

16. The system of claim 15, wherein the display further includes a visual representation of the timeline.

17. The system of claim 15, wherein the display visually promotes the portion of interest over the one or more remaining portions by increasing a display window size of the portion of interest relative to the one or more remaining portions.

18. The system of claim 15, wherein the display visually promotes the portion of interest over the one or more remaining portions by highlighting the portion of interest relative to the one or more remaining portions.

19. The system of claim 15, wherein each of the video streams captures the physical area from different angles.

* * * * *